United States Patent Office 3,224,093
Patented Dec. 21, 1965

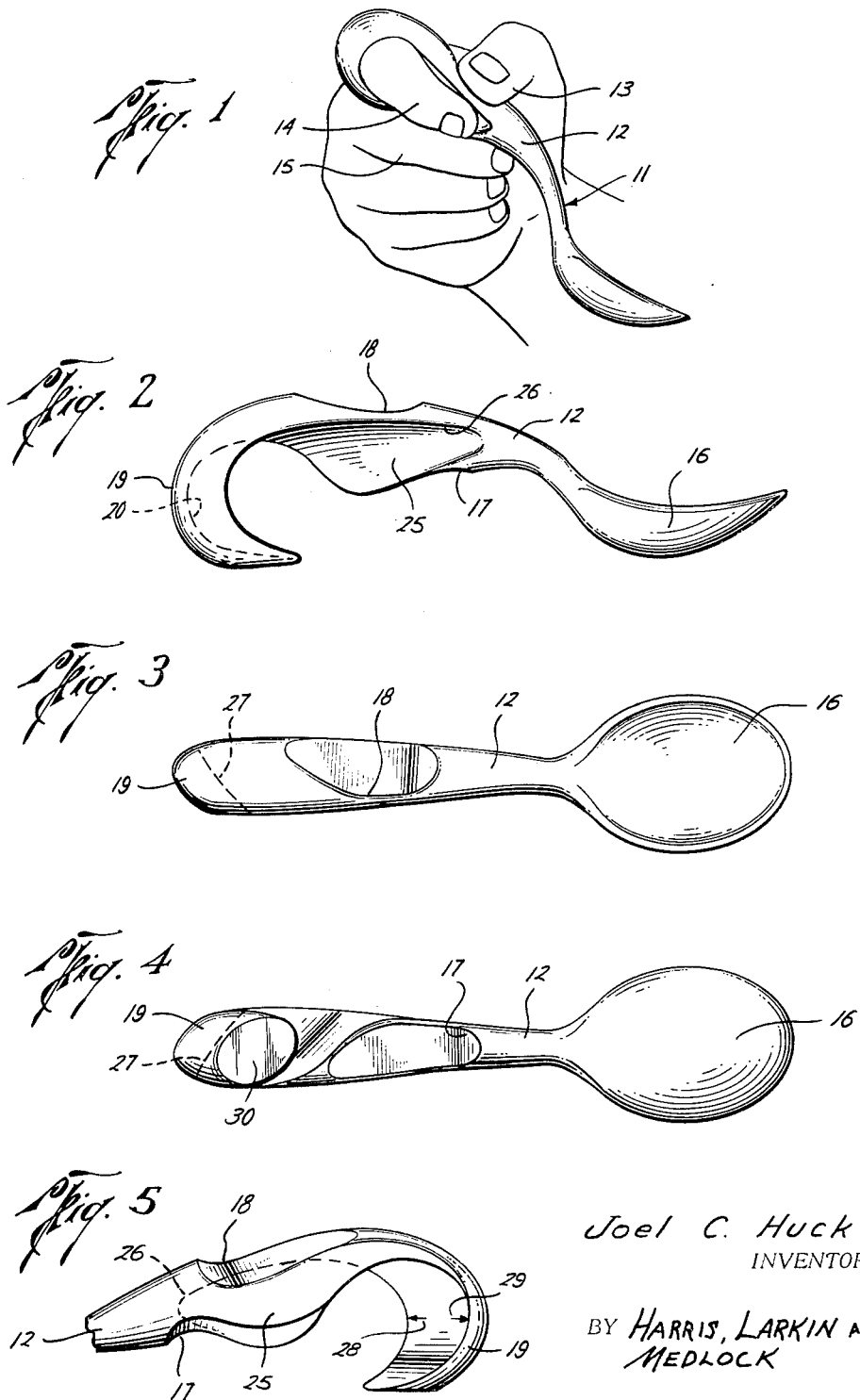

1

3,224,093
TRAINING UTENSIL
Joel C. Huck, 3310 Ajeman, Houston, Tex.
Filed June 1, 1965, Ser. No. 460,409
3 Claims. (Cl. 30—324)

This application is a continuation-in-part of my earlier filed and copending application entitled "Training Utensil" bearing Serial Number 342,383 filed February 4, 1964, now abandoned, by the same inventor.

This invention relates to a training utensil for training persons to hold eating utensils of the spoon or fork type in the socially correct eating position with the hand held partially closed, as is normal when using utensils of the type noted. More particularly, this invention relates to a training utensil for use by persons such as infants or arthritic patients whereby they may be taught or trained to feed themselves by the use of standard eating utensils which are held in the socially acceptable position in the hand.

In providing such a training utensil, it is desirable to have one which will readily and naturally fit into the hand of the infant or person using it. Moreover, it is important to have a utensil which will readily "cling" to the hand, but from which the hand may be readily and quickly removed when desired. The utensil should be comfortable to hold by the fingers and adapted for easy disengagement therefrom.

A utensil of the type described should be easy to manufacture and relatively inexpensive to construct so as to be readily marketable. The design of the utensil should be such that it presents no sharp edges which might present a hazardous condition when used by infants. The utensil should likewise be easily cleaned with no hidden recesses to entrap food and the like.

There are certain prior art utensils which have been developed with the foregoing general objects in view, but these utensils have not been satisfactory in that they lacked one or more of the foregoing described desirable features.

It is, therefore, an object of this invention to provide an improved training utensil of the type described which has the aforesaid described features and which constitutes a great improvement over prior art devices.

Briefly stated, the training utensil of the instant invention is adapted to train persons to hold eating utensils in the proper eating position with the hand held partially closed and comprises a generally elongated and contoured or streamlined handle having top and bottom notches intermediate the end thereof, with the top notch adapted for positioning the first phalanx of the thumb thereagainst and the bottom notch adapted for resting on the middle finger.

The forward end of the utensil has attached thereto a food supporting portion such as a spoon bowl or a fork. The rearward end of the handle has attached thereto a downwardly extending curved portion which has a curved inner surface which is adapted to at least partially encircle the third phalanx of the index finger.

The handle is also provided with what may be described as a depending portion which is attached to the lower side at a point rearwardly of the lower notch, which depending portion forms a side notch for positioning of the first and second phalanges of the index finger therealongside.

It is to be understood that the handle is preferably of unitary construction and smoothly contoured or streamlined so as to aovid sharp edges or deep crevices.

Reference to the drawings will further explain the invention where like numerals refer to like parts and in which:

FIG. 1 is a perspective view showing an infant's hand properly grasping one embodiment of the instant invention.

FIG. 2 is an enlarged side elevation view of the utensil shown in FIG. 1, showing what will be referred to as the finger side of the utensil.

FIG. 3 is a top plan view of the utensil shown in FIG. 2.

FIG. 4 is a bottom plan view of the utensil.

FIG. 5 is a fragmentary side elevation view of the utensil, showing what will be referred to as the palm side of the utensil.

FIG. 1 shows the utensil 11 being grasped by an infant's hand in the proper position. The hand is shown in the partially closed position, with the palm of the hand being generally perpendicular to the horizontal. Handle 12 of the utensil 11 is being held on the top side thereof by first phalanx 13 of the thumb, and by index finger 14 and middle finger 15. This will readily be recognized as the socially proper method of holding an eating utensil such as a spoon, fork or the like.

For purposes of convenience, that side of handle 12 which is nearest the palm of the hand when the utensil is held as shown in FIG. 1 will be referred to as the palm side and the opposite side thereof will be referred to as the finger side. In addition, the endmost phalanx bone of the index finger will be referred to as the first phalanx, with the phalanx attached thereto as the second phalanx, and with the next phalanx attached thereto as the third phalanx.

FIG. 2 shows the finger side of the utensil. Handle 12 has attached to the forward end thereof a food supporting portion in the form of spoon bowl 16 which is adapted to hold and support food. Handle 12 is generally elongated and slightly curved and is provided with bottom notch 17 intermediate the ends thereof and with top notch 18 spaced just rearwardly of bottom notch 17. Bottom notch 17 is adapted to rest on middle finger 15 and top notch 18 is adapted for positioning first phalanx 13 of the thumb thereagainst.

The rearward end of handle 12 has attached thereto a generally hook shaped downwardly extending curved portion 19 having a curved inner surface 20 which is adapted to at least partially encircle the third phalanx of the index finger.

Handle 12 is also provided or has attached thereto what may conveniently be described as a depending portion 25 rearwardly of bottom notch 17 and forming side notch 26 for positioning the first and second phalanges of index finger 14 thereagainst.

Curved inner surface 20 of curved portion 19 is generally angularly aligned with respect to the long axis of handle 12. This angularity is best shown by dotted line 27 shown in FIGS. 3 and 4, which line is taken between the points of arrows 28 and 29 shown in FIG. 5 and runs at an angle of about 60° with respect to the long axis of handle 12.

Top notch 18 is generally slanted downwardly toward the palm side of the utensil as best shown in FIGS. 3 and 5, to thereby more conveniently accommodate phalanx 13 of the thumb thereagainst.

Bottom notch 17 extends rearwardly such that a part of the supporting surface thereof is formed by depending portion 25 as best seen in FIG. 5.

Side notch 26 is streamlined so as to link or join with curved inner surface 20 as is best seen in FIGS. 2, 4 and 5.

As viewed in FIG. 4, the bottom end of curved portion 19 is provided with a generally flat circular area 30 for manufacturing convenience.

In use, the utensil will be held as shown in FIG. 1 with the thumb pressing generally downwardly at top notch 18 and with middle finger 15 supporting underneath at bottom notch 17 to thereby hold the utensil from a pitching movement relative to the hand. The third phalanx of index finger 14 is positioned against curved surface 20 to thereby prevent lateral movement of the utensil relative to the hand.

Pressure applied by the first and second phalanges of index finger 15 against side notch 26 in combination with the pressure being applied by the thumb will prevent yawing movement of the utensil relative to the holding hand.

The art has thus been supplied with a utensil for training children or the like which will form fit the properly positioned hand. It may also be used as an eating tool for handicapped persons who are unable to securely hold and manipulate a standard shaped spoon or fork. The utensil may be made in different sizes to accommodate different sized hands. Moreover, the utensil may be made to accommodate either right or left handed persons. The unique design of the utensil allows complete control thereof with easy disengagement of the fingers. The design of the utensil also allows easier and more secure grasping such that it is dropped less frequently than standard utensils.

While the various portions and parts of the utensil have been described as being attached together, it is to be understood that that term is sufficiently broad to encompass a utensil which is molded or otherwise formed out of a unitary piece of material such as metal, plastic, wood or the like.

Modifications may be made in the invention as particularly described without departing from the scope of the invention. Accordingly, the foregoing description is to be construed as illustratively only and is not to be construed as a limitation upon the invention as defined in the following claims.

What is claimed is:
1. A training utensil for training persons to hold eating utensils in the eating position with the hand held partially closed, said training utensil comprising:
a generally elongated handle having top and bottom notches intermediate the ends thereof, said top notch adapted for positioning the first phalanx of the thumb thereagainst and said bottom notch adapted for resting on the middle finger;
a food supporting portion attached to the forward end of said handle;
a downwardly extending curved portion attached to the rearward end of said handle and having a curved inner surface for at least partially encircling the third phalanx of the index finger, and
a depending portion attached to the lower side of said handle rearwardly of said bottom notch and forming a side notch for positioning the first and second phalanges of said index finger thereagainst.

2. The utensil as claimed in claim 1 wherein:
said downwardly extending curved portion is generally hook shaped and said curved inner surface thereof is angularly aligned with respect to the long axis of said handle.

3. A training utensil for training persons to hold eating utensils in the eating position with the hand held partially closed, said training utensil comprising:
a generally elongate handle having a palm side and a finger side and having a bottom notch intermediate the ends thereof adapted for resting on the middle finger and a top notch spaced rearwardly of said bottom notch for positioning the first phalanx of the thumb thereagainst;
a food supporting portion attached to the forward end of said handle;
a downwardly extending hook shaped portion attached to the rearward end of said handle and having a curved inner surface angularly aligned with respect to the long axis of said handle for partially encircling the third phalanx of the index finger; and
a depending portion attached to the lower side of said handle rearwardly of said bottom notch and forming a side notch on the finger side of said handle, which side notch is curved to link with the curved inner surface of said hook shaped portion for positioning the first and second phalanges of said index finger thereagainst.

References Cited by the Examiner

UNITED STATES PATENTS

| | | |
|---|---|---|
| D. 158,818 | 5/1950 | Titensky. |
| D. 200,006 | 1/1965 | Heintz _____ 54—12 |
| 1,128,190 | 2/1915 | Routery _____ 30—327 |
| 1,625,003 | 4/1927 | Walker _____ 30—324 |
| 2,576,388 | 11/1951 | Claflin _____ 30—327 |
| 3,111,322 | 11/1963 | English. |

WILLIAM FELDMAN, *Primary Examiner.*

JAMES L. JONES, JR., *Examiner.*